Figure 1:
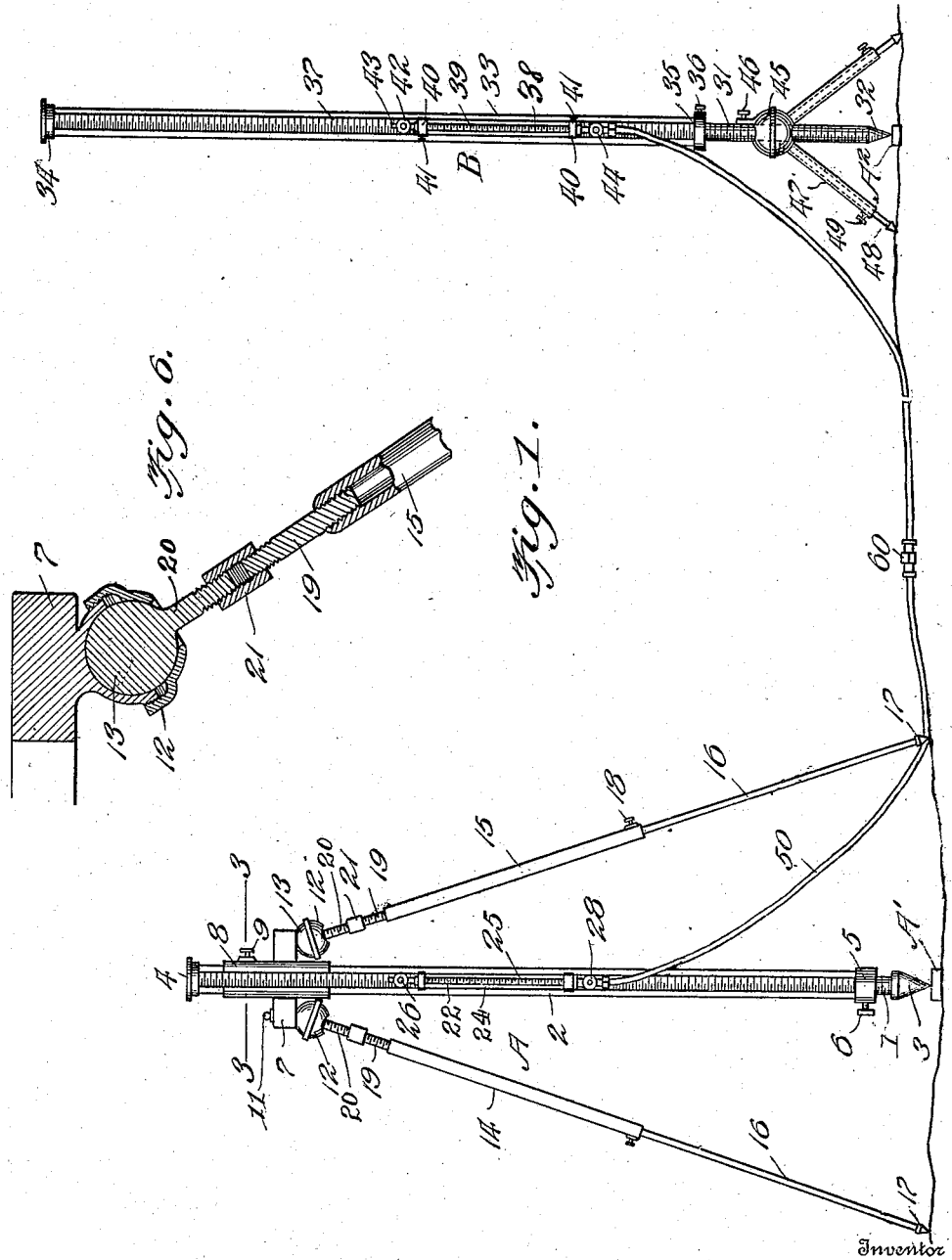

W. NUGENT.
SURVEYING OR LEVELING INSTRUMENT.
APPLICATION FILED JULY 28, 1908.

919,934.

Patented Apr. 27, 1909.
2 SHEETS—SHEET 1.

Witnesses
Frank B. Hoffman
C. C. Hines

Inventor
William Nugent
By Victor J. Evans
Attorney

W. NUGENT.
SURVEYING OR LEVELING INSTRUMENT.
APPLICATION FILED JULY 28, 1908.

919,934.

Patented Apr. 27, 1909.
2 SHEETS—SHEET 2.

Witnesses
Frank B. Hoffman
C. C. Hiner

Inventor
William Nugent
By Victor J. Evans
Attorney

UNITED STATES PATENT OFFICE.

WILLIAM NUGENT, OF DENVER, COLORADO.

SURVEYING OR LEVELING INSTRUMENT.

No. 919,934.     Specification of Letters Patent.     Patented April 27, 1909

Application filed July 28, 1908. Serial No. 445,800.

*To all whom it may concern:*

Be it known that I, WILLIAM NUGENT, a citizen of the United States, residing at Denver, in the county of Denver and State of Colorado, have invented new and useful Improvements in Surveying or Leveling Instruments, of which the following is a specification.

This invention relates to a hydrostatic surveying or leveling instrument, designed for use in grading, leveling, ascertaining corresponding points in a horizontal plane in surveying and in all building operations, including excavations, mining, submarine work, etc., and for all purposes where it is desired to ascertain the difference in altitude of definite points, or by means of which the difference in the grade of any two points at greater or less distances apart may be readily and conveniently determined.

The object of the invention is to provide an apparatus embodying two instruments adapted to be arranged at different distances apart and provided with water or spirit gages adjustably mounted thereon for location at different levels and connected by a flexible conductor, the gages and conductors being partially filled with a suitable liquid, such as water, whereby when the instruments are properly set the difference in the reading of the scales through the variation of the levels of the liquid therein will indicate the difference in the grades or levels, and further to provide for the adjustment of the instruments to set the gages at different altitudes as circumstances may require.

Another object of the invention is to provide an apparatus of this character whereby, through the use of the flexible conductor, the instruments may be arranged at different positions such as cannot be ordinarily reached, as over or around a wall or like construction in a building, or through passageways of mines or excavations, and which is provided with means whereby the apparatus may be readily primed for use with the desired liquid and the operating parts adjusted with greater facility and to an increased extent to afford greater convenience in the use of the instrument as well as for increasing its capacity for measuring differences in altitudes.

With these and other objects, the invention consists of the features of construction, combination and arrangement of parts hereinafter fully described and claimed, reference being had to the accompanying drawings, in which:—

Figure 2:
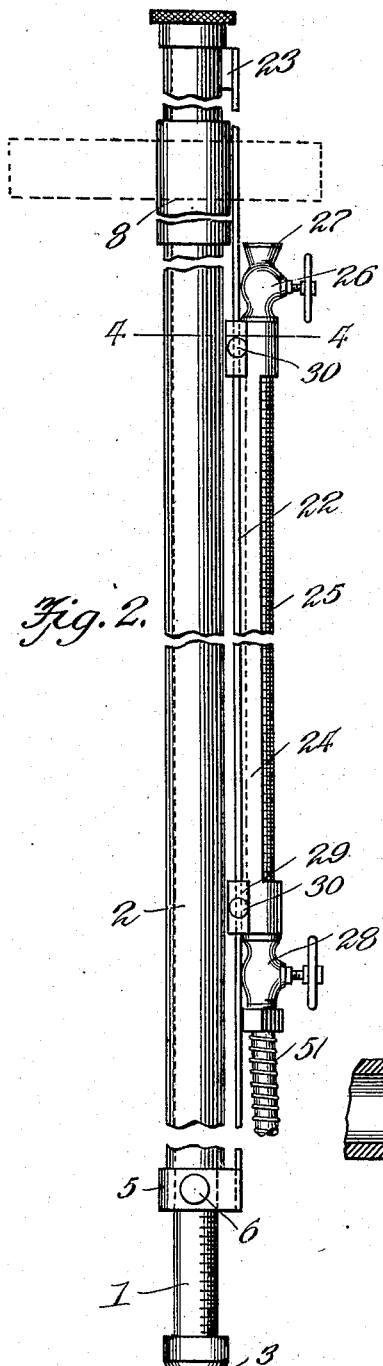
Figure 3:
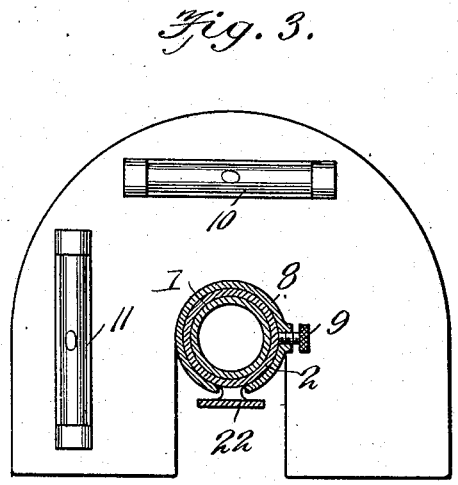
Figure 4:
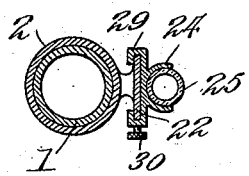
Figure 5:
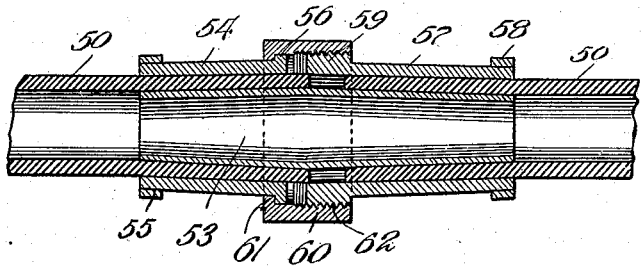

Figure 1 is a front elevation of the device as set up for use. Fig. 2 is a side elevation on an enlarged scale of one of the instruments, which may, for convenience of description, be called the relatively movable instrument. Fig. 3 is a horizontal section on an enlarged scale on the line 3—3 of Fig. 1. Fig. 4 is a similar section on the line 4—4 of Fig. 2. Fig. 5 is a longitudinal section through the coupling. Fig. 6 is a detail section through one of the legs of the tripod of the movable instrument.

The device comprises a pair of generally similar measuring instruments A and B, both of which are readily transportable, but which, for convenience in differentiating the same, may be termed relatively movable and stationary instruments. The instrument A comprises a staff or upright consisting of an inner rod or tube 1 and an outer tube 2, inclosing and telescopically adjustable on said inner tube. The tube 1 is provided on its outer surface with an altitude scale, being graduated vertically as indicated, and has a pointed lower end 3 to rest upon one of the fixed points or objects A' whose level is to be determined. The tube 2 is closed at its upper end by a cap 4 and is provided at its lower end with a collar 5 carrying a set screw 6 for fixing it in adjusted position on the rod or tube 1. The lower edge of this collar serves as an indicator for use in conjunction with the graduations of the scale on the rod 1 to indicate the degree of adjustment of the tube 2, which is thus adjustable to vary the height of the instrument.

The staff or upright is supported by a tripod comprising a head block 7 of partially circular form and having a recess within which is secured a split guide tube or sleeve 8 which partially incloses the tube 2 and forms a guide therefor, and is provided with a set screw 9 to adjustably secure it to said tube. On the head block 7 are spirit levels 10 and 11 arranged at right angles to each other, by the use of which the operator may determine when the instrument is set exactly in a perpendicular position. To the underside of the head block are secured sockets 12 receiving partially spherical heads 13 on the upper ends of the legs 14 of the tripods. These legs are adjustable as to length, and each preferably comprises a tubular main section 15 adapted to slidably receive an extension section 16, the latter being provided at its lower end with a point 17 to enter the ground or supporting surface. Through the extensibility of the legs the tripod may be adjusted to accord with the adjustment of the staff. The tube 15 is provided with a set screw 18 to secure the section 16 in adjusted position, and is preferably detachably coupled to the coacting head 13 by providing it with a reduced threaded stem 19 at its upper end connected with a corresponding stem 20 projecting from the head by a coupling tube 21, thus enabling the parts to be readily assembled and disassembled. The tube 2 carries at one side a longitudinal graduated scale plate or strip 22 fixed at its upper end to a lug 23 and at its lower end to the collar 5. Adjustably supported by this plate or strip is a frame 24 carrying a glass gage tube 25, open at each end, the upper end of the tube being provided with a valve or cock 26 having a priming cup or inlet 27, and the lower end of the tube having a controlling valve or cock 28. The frame 24 carries at its upper and lower ends hooked slides or brackets 29 which engage the opposite side edges of the strip 22, thus slidably mounting the tube thereon for vertical adjustment, and said slides carry set screws 30 for securing the tube in adjusted position.

The instrument B comprises a rod or tube 31 graduated like the rod 1 and provided at its lower end with a point 32 to rest upon the other fixed point or object A² whose level is to be determined. Slidably mounted on this rod 31 is a tube 33 corresponding in construction with the tube 2 of the instrument A, being provided with a closure cap 34 at its upper end, a collar 35 at its lower end carrying a set screw 36 to engage the rod 31, and having arranged upon the front thereof a graduated scale plate or strip 37 corresponding in character with the strip 22. A frame 38 carries a graduated glass tube 39 corresponding to the tube 25, and is provided with hooked brackets 40 slidably engaging said strip 37 and provided with set screws 41 to fasten it in adjusted position thereon. The upper end of the tube is provided with a valve or cock 42 having a priming cup 43, while the lower end thereof is provided with a valve 44, these parts being the same in construction and arrangement as the corresponding parts of the tube of the instrument A. The staff or standard in this instrument B, composed of the rod 31 and inclosing tube 33, is supported by a tripod comprising a head 45 slidably mounted on the rod 41 and provided with a set screw 46 to fix it to said rod. From this head projects hollow arms 47 inclosing extension rods 48 having pointed outer ends and adapted to be adjustably secured to the arms by set screws 49 mounted on said arms, the arms and rods constituting the extensible legs of the tripod, by which the latter is rendered vertically adjustable to vary its height as occasion may require.

The glass tubes of the two instruments A and B are adapted to be connected by a flexible hose or conductor 50, which may be formed of two or more sections secured at their outer ends in any preferred manner to the valves 28 and 44. These hose sections are preferably protected by providing them with an encircling reinforcing coil 51 of wire or the like, which will enable them to be handled and dragged without liability of injury. The proximate ends of the hose sections are adapted to be coupled in a manner which will admit of their ready disconnection when occasion requires, and yet so as to prevent leakage of the contained fluid at the joint. The coupling device employed comprises a double frusto-conical tube 53, the tapered ends of which are adapted to fit within the proximate ends of the hose sections, as shown in Fig. 5. Mounted upon the end of one of the hose sections is a coupling member 54, consisting of a tapered tube having at its outer end a strengthening band or enlargement 55 and at its inner end an external flange or collar 56. Mounted upon the end of the other hose section is a correspondingly shaped coupling member 57 having at its outer end a strengthening band 58 and at its inner end an externally threaded enlargement 59. A sleeve or collar 60 is provided to connect the inner ends of the coupling members 54 and 57 and is provided at one end with a flange 61 to engage the flange 56, and is internally threaded, as at 62, to receive and engage the threaded enlargement 59, so that it will be swiveled to the section 54 and have a threaded engagement with the section 57, whereby said sections may be drawn together and will force the inclosed end of the hose sections firmly and securely against the tapered portions of the tube 53, which extends across the joint between said sections, thus preventing any possibility of leakage of the contained liquid at the joint, while permitting of the ready disconnection of the hose sections when occasion requires. Through the use of two or more of these couplings three or more hose sections may be employed to adapt the two instruments A and B to be arranged at varying distances apart, or to adapt the hose to have sufficient length to extend around a wall or other obstruction between the two instruments when it cannot be extended over the same.

In priming the apparatus for use, the valves of the gage tubes of both instruments are opened and enough water is poured into the tubes through one or both of the filling cups 27 and 43 to entirely fill the hose and partially fill each of the tubes, so that when the instruments stand at the same level the reading, as indicated, by the height of the water, will be the same in both tubes. The instrument B is then adjusted and set at one point of the grade, say at the higher level, care being taken to insure its exact perpendicularity by the use of a plumb level or other analogous device, and then the valves of both instruments are closed and the instrument A transported to the other point of the grade or lower level and set in an exact perpendicular position, which may be determined by the use of the levels 10 and 11. The staffs and tripods of both instruments are then adjusted to lengthen or shorten the same as circumstances or conditions may require, and then the valves are opened to permit the water or liquid contained in the connecting conduit to assume its proper level within each gage tube, the difference in the reading of the tubes according to the height of the water therein indicating the variation between the levels of the two grade points. The apparatus may be employed for various other surveying and leveling operations, as will be manifest to those versed in the art, and therefore, a statement of the mode of operation in performing the various kinds of calculations need not be specifically set forth. The advantages of the device, however, will in general be readily understood, and it will be apparent that by forming the staffs of each instrument of telescopic sections, thus providing for their extension to different heights or levels, the degree of usefulness and convenience of the apparatus is increased to a material extent. In cold weather, a suitable spirit or non-freezing liquid may be employed instead of water.

Having thus fully described the invention, what is claimed as new is:—

1. A surveying or leveling instrument comprising a pair of staffs, each staff embodying telescopic sections, a tripod for supporting each staff, a scale upon each staff, gage tubes slidably mounted upon the scales of the staff, a flexible conductor connecting the lower ends of said tubes, and suitable valves controlling the tubes.

2. A surveying or leveling instrument comprising a pair of staffs, each staff embodying a graduated rod and a sleeve partially inclosing the same, means for adjustably connecting the sleeve of each staff with its rod, a scale strip or plate upon each sleeve, an extensible tripod for supporting each staff, gage tubes slidably mounted upon the scale strips or plates of the staffs, a flexible conductor connecting the lower ends of said tubes, and suitable valves controlling the tubes.

3. A surveying or leveling instrument comprising two staffs, each embodying a graduated rod having a pointed lower end and a sleeve telescopically engaging the rod and provided with means for adjustably securing it thereto, an adjustable tripod connected with one of the sections of each staff for supporting the respective staffs, graduated plates upon the sleeves of the staffs, gage tubes slidably engaging said plates, a flexible conductor connecting the tubes, and controlling valve upon the tubes.

In testimony whereof I affix my signature in presence of two witnesses.

WILLIAM NUGENT.

Witnesses:
E. J. BEAN,
CLAUDE M. TAUSSIG.